United States Patent [19]

Comer et al.

[11] Patent Number: 4,694,528
[45] Date of Patent: Sep. 22, 1987

[54] CONVERTIBLE VACUUM-BLOWER

[75] Inventors: Robert C. Comer, Hopkins; Wilbur J. Hampel, Spring Park; Edward A. Rogers, Minneapolis, all of Minn.

[73] Assignee: The Toro Company, Minneapolis, Minn.

[21] Appl. No.: 886,815

[22] Filed: Jul. 18, 1986

[51] Int. Cl.$^4$ .............................................. B02C 18/06
[52] U.S. Cl. ...................................... 15/330; 15/339; 15/344; 15/405; 417/234
[58] Field of Search ................. 15/344, 405, 330, 378, 15/422, 339; 415/121 G, 159; 417/234

[56] References Cited

U.S. PATENT DOCUMENTS

| | | |
|---|---|---|
| D. 57,109 | 2/1921 | Brintzenhofe . |
| D. 162,312 | 3/1951 | Karstadt . |
| D. 258,908 | 4/1981 | Satoh . |
| D. 263,547 | 3/1982 | Carsello . |
| 1,182,595 | 5/1916 | Stecker . |
| 1,255,662 | 2/1918 | Sullivan . |
| 1,289,809 | 12/1918 | Kern . |
| 1,293,250 | 2/1919 | Trautman . |
| 1,301,964 | 4/1931 | Kuendig . |
| 1,364,360 | 1/1921 | Emery . |
| 1,583,528 | 5/1926 | Clements . |
| 1,728,021 | 9/1929 | Tuteur . |
| 1,749,373 | 3/1930 | Breuer . |
| 1,776,778 | 9/1930 | Breuer . |
| 1,940,609 | 12/1933 | Simpson . |
| 1,997,754 | 4/1935 | Sharp . |
| 2,024,367 | 12/1935 | Eriksson-Jons . |
| 2,464,552 | 3/1949 | Breuer . |
| 2,586,145 | 2/1952 | Breuer et al. . |
| 2,598,499 | 5/1952 | Breuer et al. ..................... 15/330 X |
| 2,623,234 | 12/1952 | Brown . |
| 3,147,510 | 9/1964 | Thompson . |
| 3,618,157 | 11/1971 | Bassin . |
| 3,712,353 | 1/1973 | Ferry . |
| 3,968,938 | 7/1976 | Ruhl et al. . |
| 4,118,826 | 10/1978 | Kaeser ............................... 15/405 X |
| 4,223,419 | 9/1980 | Sato et al. .......................... 15/405 X |
| 4,269,571 | 5/1981 | Shikutani et al. .................... 417/234 |
| 4,288,886 | 9/1981 | Siegler .................................... 15/330 |
| 4,325,163 | 4/1982 | Mattson et al. ............. 415/121 G X |
| 4,451,951 | 6/1984 | Satoh ..................................... 15/330 |
| 4,644,606 | 2/1987 | Luerken et al. ....................... 15/330 |

OTHER PUBLICATIONS

McCulloch, Eager Beaver, *The Powerful, Portable Clean Up Machines.*

Primary Examiner—Chris K. Moore
Attorney, Agent, or Firm—Banner, Birch, McKie & Beckett

[57] ABSTRACT

A convertible vacuum-blower which includes a housing having an air inlet and an air outlet is disclosed. A motor and an impeller are supported in the housing. The impeller is supported for rotary motion and is driven by the motor. The impeller is in fluid communication with both the air inlet and the air outlet. The air inlet is selectively covered by an apertured, removable air inlet cover. A mechanism removably secures the air inlet cover to the housing. A switch mechanism is carried by the housing and allows the motor to operate when the air inlet is covered, but not when the air inlet is uncovered. A first switch actuator is carried by the air inlet cover for actuating the switch mechanism when the cover is secured to the housing covering the air inlet. A removable vacuum nozzle also includes a second switch actuator for actuating the switch means when the vacuum nozzle is secured to the housing covering the air inlet.

17 Claims, 21 Drawing Figures

CONVERTIBLE VACUUM-BLOWER

TECHNICAL FIELD

The present invention is directed to a convertible vacuum-blower apparatus; and more particularly to a portable apparatus which can be used to vacuum or blow lawn debris such as leaves.

BACKGROUND OF THE INVENTION

Convertible and portable vacuum-blower apparatus are known in the prior art. Such apparatus typically include a housing which holds a motor and an impeller driven by the motor. The impeller communicates with an air inlet and an air outlet. During use as an air blower, an apertured cover is placed over the air inlet and a blower nozzle is attached to the air outlet to direct a stream of air in a desired direction. During use as a vacuum, the apparatus is converted by removing the apertured cover and placing a vacuum nozzle in communication with the air inlet, and substituting a debris bag for the blower nozzle at the air outlet. U.S. Pat. No. 4,325,163 issued on Apr. 20, 1982 to Mattson et al is one such prior art apparatus.

A potential safety hazard in such apparatus exists when the apparatus is being coverted from its blower mode to its vacuum mode, and vice versa. During conversion, the vacuum nozzle or apertured cover are removed from the air inlet, thus exposing the impeller blades. If the motor were accidently turned on while the impeller blades were exposed, a person could be injured by the rotating impeller blades.

Another disadvantage of the prior art convertible blowervacuum apparatus is that they supply the same velocity of air to the air outlet in both the blower and vacuum modes. However, it is desirable to have a higher velocity of air when the apparatus is operating in its blower mode.

SUMMARY OF THE INVENTION

The present invention relates to a convertible vacuum-blower which includes a housing having an air inlet and an air outlet. A motor and an impeller are supported in the housing. The impeller is supported for rotary motion and is driven by the motor. The impeller is in fluid communication with both the air inlet and the air outlet. The air inlet is selectively covered by an apertured, removable air inlet cover. A mechanism removably secures the air inlet cover to the housing. A switch mechanism is carried by the housing and allows the motor to operate when the air inlet is covered, but not when the air inlet is uncovered. A first switch actuator is carried by the air inlet cover for actuating the switch mechanism when the cover is secured to the housing covering the air inlet.

A removable vacuum nozzle also includes a second switch actuator for actuating the switch means when the vacuum nozzle is secured to the housing covering the air inlet.

In a preferred embodiment, the housing includes a latching surface surrounding the air inlet. The switch mechanism includes a switch tab which extends above the latching surface and is biased toward the housing and latching surface. The switch tab includes an inclined surface spaced from and facing the latching surface. The switch actuator of the inlet cover and the vacuum nozzle includes a first surface for contacting the latching surface and a ramp surface with an incline generally matching the incline of the switch tab. The ramp surface faces the incline surface so that motion of the ramp surface along the incline surface during attachment of the cover or nozzle to the housing pulls the switch tab outward of the latching surface and housing.

The securement mechanism preferably includes a plurality of latching tabs which extend from the latching surface and have latching flanges spaced from and extending along the latching surface. The cover and nozzle include a plurality of locking tabs with locking flanges which interlock between the latching flanges and latching surface by rotary motion of the cover or nozzle with respect to the housing.

The switch tab of the switch mechanism requires an outward pulling force to activate it and is relatively small and hard to grasp. Thus, it is difficult to override the switch mechanism and operate the motor with either the air inlet cover or vacuum nozzle removed. While it is difficult to override the switch mechanism, it is easy to activate the switch mechanism with the actuator tab on the inlet cover and vacuum nozzle.

In a preferred embodiment, the present invention also includes a device for automatically increasing the air velocity during the blower mode of operation. The device includes a ring carried by the cover and disposed sufficiently close to the impeller to prevent air spill between the high pressure side and the low pressure side of the impeller blades. The cover also includes a mechanism for varying the size of the aperture through the cover to adjust the air flow during the blower mode of operation.

The convertible vacuum-blower apparatus also preferably includes a handle located in a plane transverse to the axis of rotation of the impeller, and a grasping area with a reduced thickness easily graspable by a hand. The grasping area is located generally in the same plane as the handle and on an opposite side of the housing from the handle to facilitate two handed operation of the vacuum-blower during operation as a vacuum. This further simplifies the construction of the housing, since two handles are not required to manipulate the device between the blower and the vacuum operating modes.

Various advantages and features of novelty which characterize the invention are pointed out with particularity in the claims annexed hereto and forming a part hereof. However, for a better understanding of the invention, its advantages, and objects attained by its use, reference should be had to the drawings which form a further part hereof, and to the accompanying descriptive manner, in which there is illustrated and described a preferred embodiment of the invention.

DETAILED DESCRIPTION OF THE INVENTION

Figure 1:
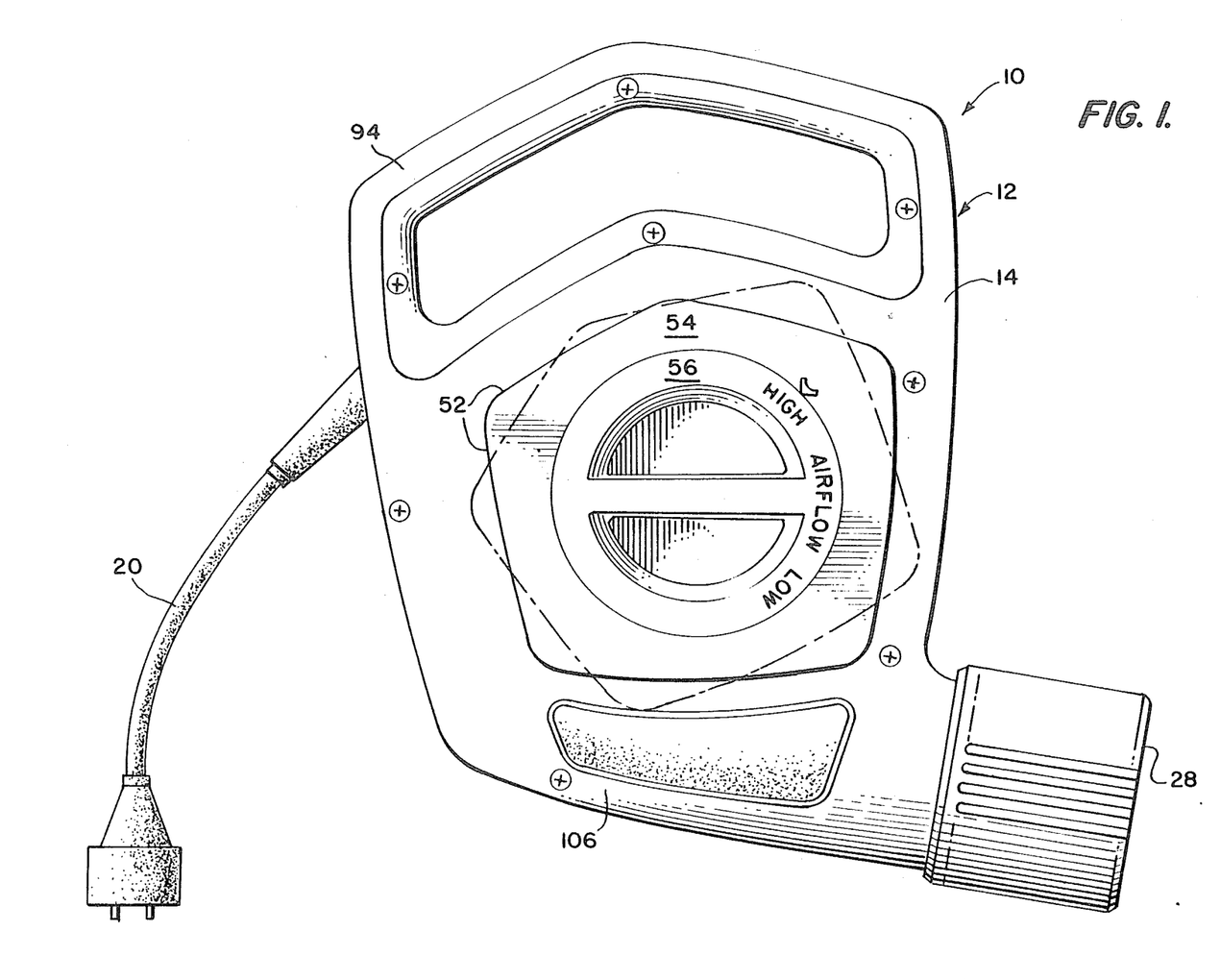
FIG. 1 is a side view of the convertible vacuum-blower in accordance with the present invention.
Figure 2:
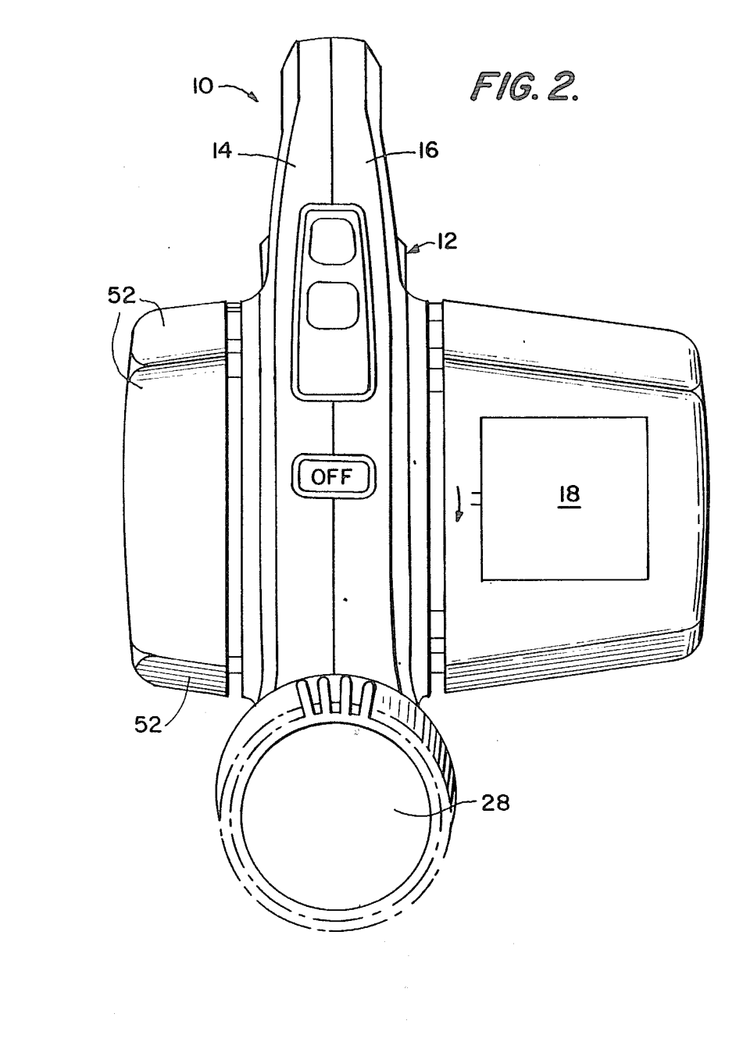
FIG. 2 is a front end view of the vacuum-blower.
Figure 3:
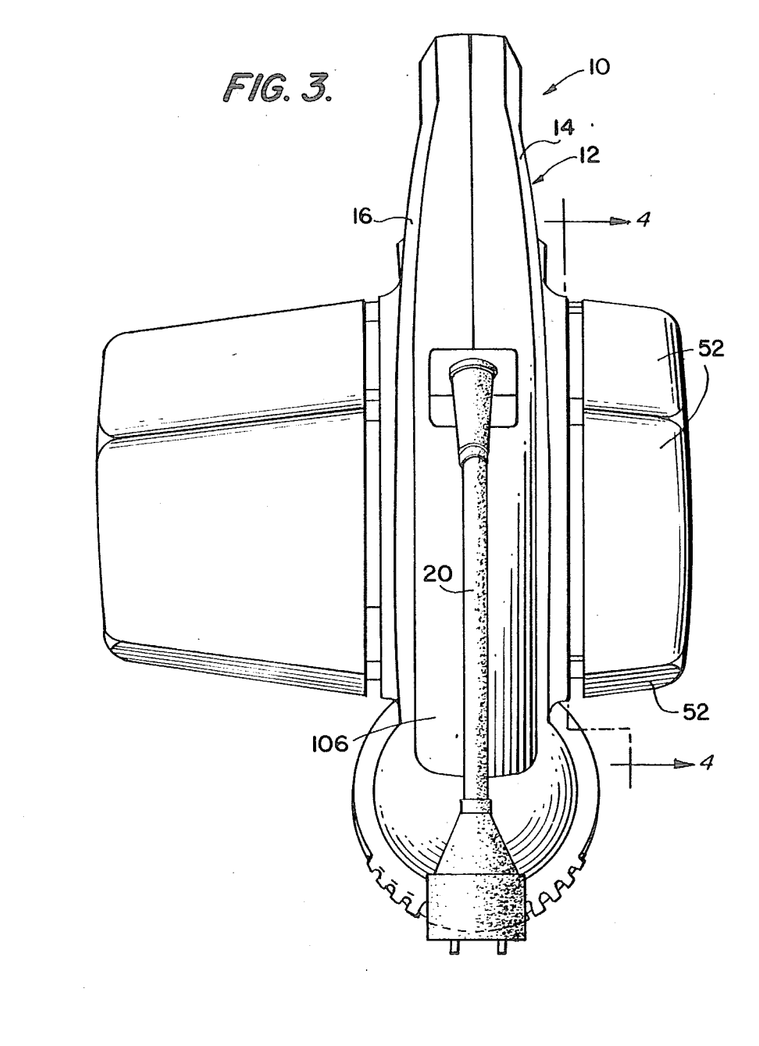
FIG. 3 is a rear end view of the vacuum-blower.
Figures 18, 19:
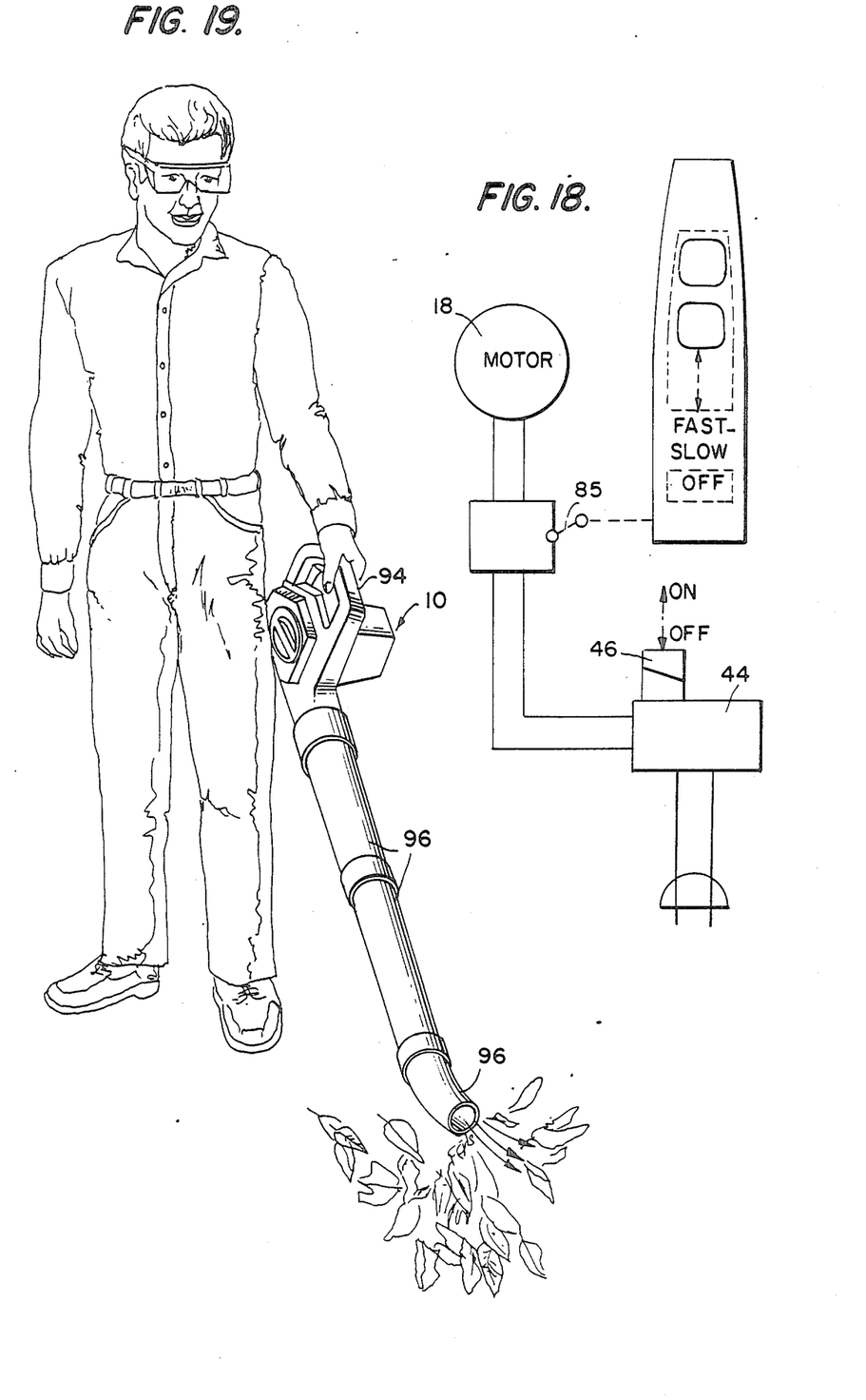
FIG. 18 is a schematic diagram of the switch mechanism for activating and deactivating the motor.
FIG. 19 is a perspective view illustrating the vacuum-blower in its blower mode of operation.

Referring to the drawings in detail, wherein like numerals indicate elements, there is shown in FIGS. 1-3 a convertible vacuum-blower apparatus in accordance with the present invention generally designated as 10. Apparatus 10 includes a housing 12 which has an air inlet side 14 and a motor support side 16. A rotary drive electric motor, shown diagrammatically as 18 in FIGS. 2 and 18, is supported in housing 12 on motor support side 16. Power is supplied to motor 18 through electrical cord 20.

Figure 6:
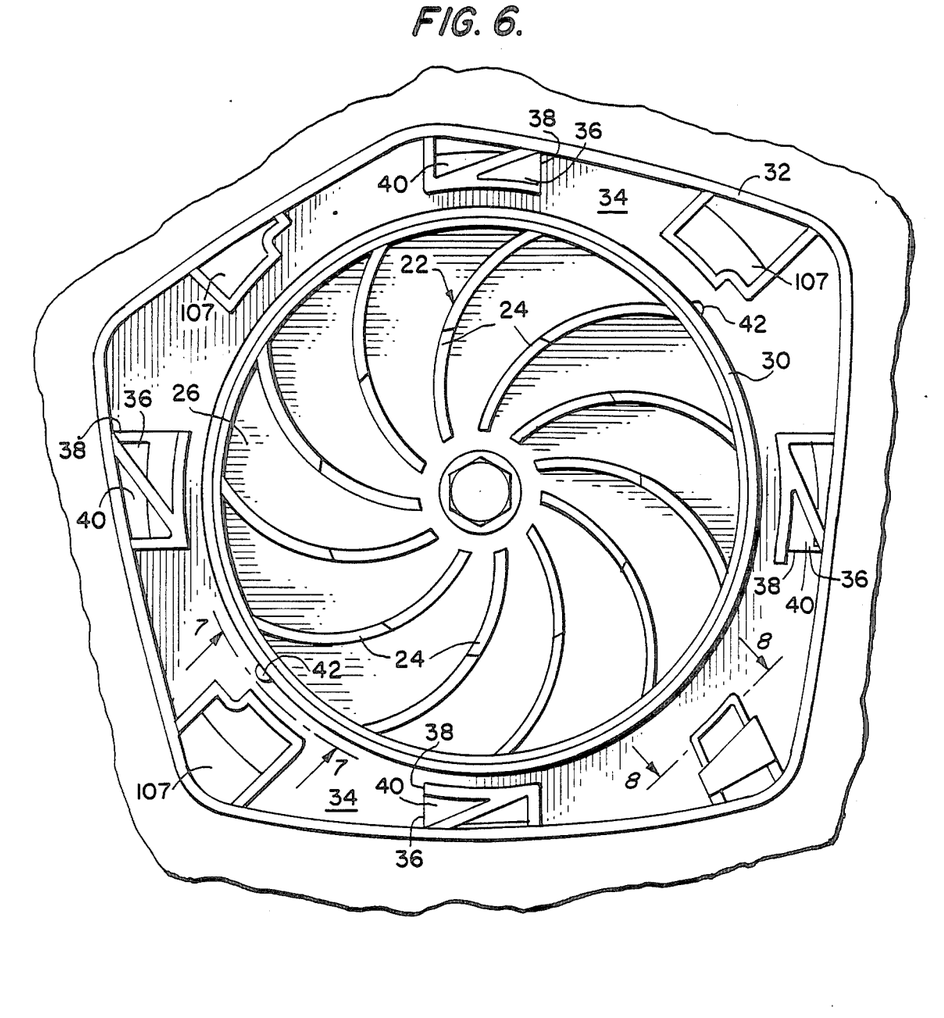
FIG. 6 is a side view of the air inlet to the housing with the air inlet cover removed.
Figure 7:
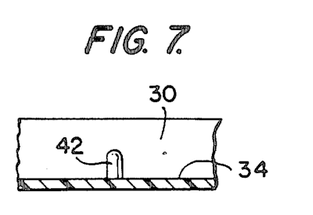
FIG. 7 is a view taken generally along curved line 7—7 of FIG. 6.

An impeller 22, as shown in FIG. 6, includes a plurality of impeller blades 24. Impeller 22 is supported for rotary motion adjacent a circular air inlet 26 on air inlet side 14 and is driven by motor 18. Air inlet 26 and impeller 22 are in fluid communication with an air outlet 28 formed in a lower central section of housing 10. The rotation of impeller 22 thus draws air in through inlet 26 and ejects the air out of housing 12 through air outlet 28. Air inlet 26 is surrounded by a circular rim 30 projecting away form the side of housing 12. An outer rim 32 also projects from side 14 of housing 12. Rim 32 is located radially outward of rim 30 and includes five straight sides and is shaped as a pentagon. The area of side 14 of housing 12 between rims 30 and 32 forms a latching surface 34.

Figure 16:
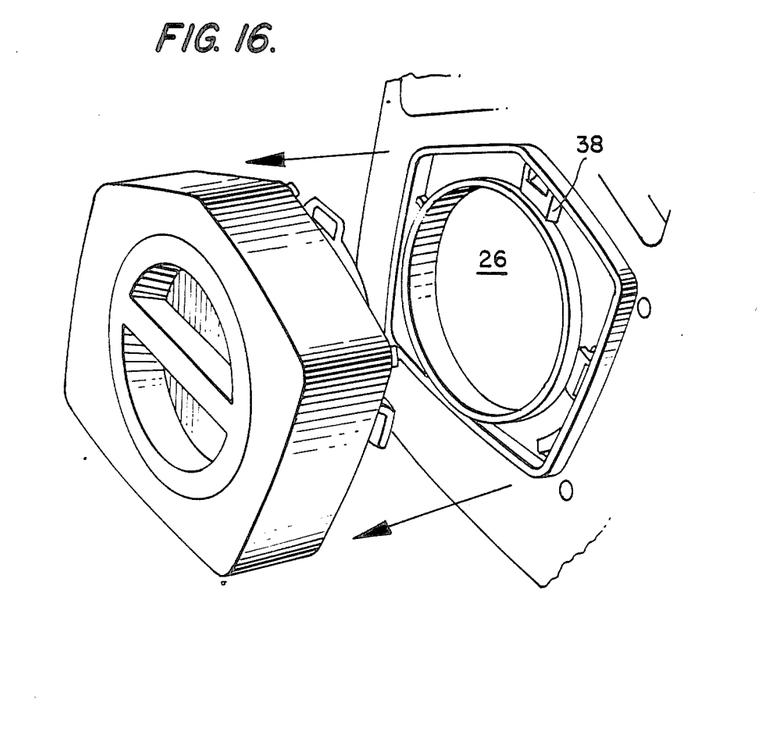
FIG. 16 is an exploded and simplified perspective view illustrating the air inlet cover adjacent to the air inlet of the housing.

A plurality of latching tabs 36 extend from latching surface 34. Each tab 34 includes a wall 38, best seen in FIGS. 16 and 17, which is fixed to latching surface 34 and extends perpendicularly away from latching surface 34. A latching flange 40 is secured to and extends away from wall 38 along the direction of latching surface 34. The end of flange 40 which is opposite wall 38 is open and the lower surface of flange 40 is spaced above latching surface 34 to allow locking tabs 60 to enter the area below latching flange 40. In addition to tabs 36, a pair of outwardly extending latching projections 42 extend radially outwardly from rim 30 at 180° spaced locations along rim 30. See FIG. 6.

An activator switch 44 is secured within housing 12 at a location below latching surface 34. A switch tab 46 extends through an opening in latching surface 34. See FIG. 8. Switch tab 46 is biased downwardly to an off position. Switch tab 46 has an inclined surface 48 which is spaced from and faces latching surface 34. As will be described more fully hereinafter, activator switch 44 is turned on by pushing upwardly against incline surface 48 of switch tab 46 to raise switch tab 46 relative to latching surface 34.

It is difficult when using one's fingers to inadvertently or intentionally raise switch tab 46 in an attempt to override or defeat activator switch 44. This is true because an upward or outward motion of switch tab 46 relative to latching surface 34, rather than a down ward or inward motion, is needed. This in turn requires something to enter beneath the switch tab 46 to push up on the incline surface 48. This is particularly difficult to do because the switch tab 46 is small and moves vertically up and down within the channel 47 of a U-shaped saddle 49 that extends up and around switch tab 46. See FIGS. 6 and 8. One vertical side wall 45 of saddle 49 is cut away to allow a switch actuator tab to enter into saddle channel 47 to push upwardly on switch tab 46. However, in other respects saddle 49 is sized sufficiently large and covers switch tab 46 to make it extremely difficult if not impossible to grab switch tab 46 with one's fingers and pull upwardly on it. Accordingly, the activating motion required of switch tab 46 is difficult to accomplish except with a properly designed element, like the switch actuator tab 66, which is adapted to fit between incline surface 48 and latching surface 34.

Figure 4:
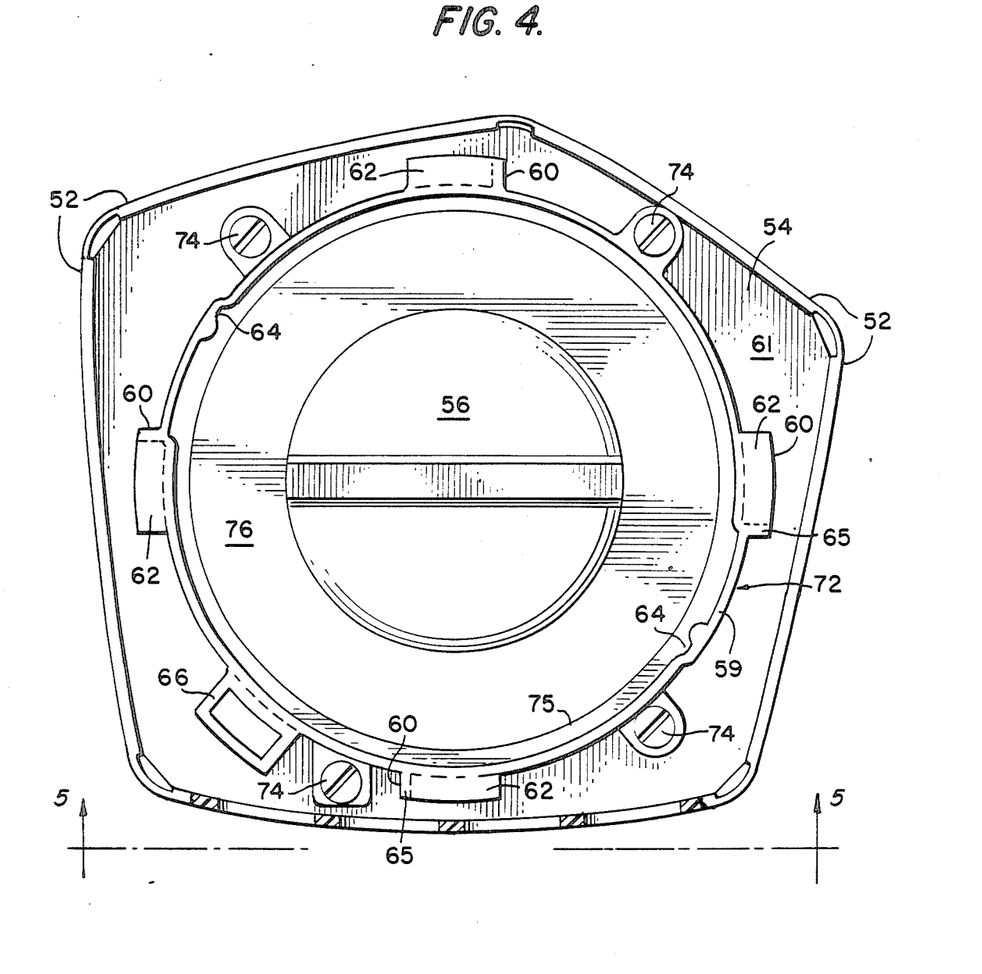
FIG. 4 is a sectional view taken generally along line 4—4 of FIG. 3 illustrating the interior of the air inlet cover.
Figure 5:
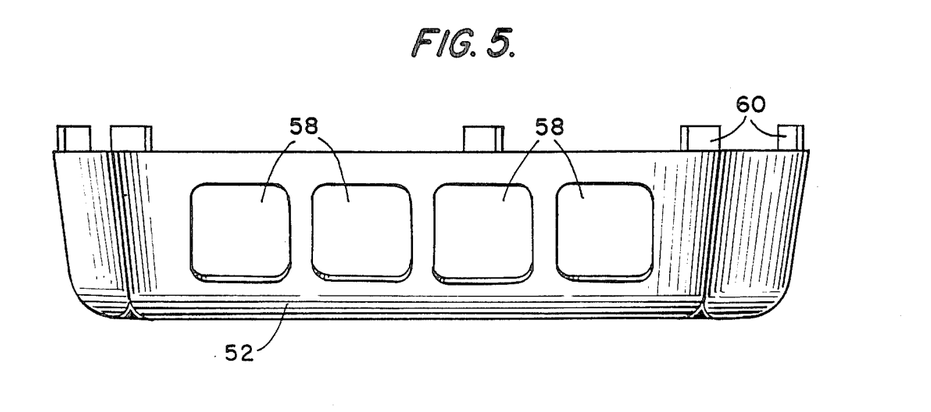
FIG. 5 is a view taken generally along line 5—5 of FIG. 4.

An air inlet cover 50, shown in FIGS. 4 and 5, can be removably attached over air inlet 26. Cover 50 is secured over air inlet 26 when apparatus 10 operates in its blower mode. Cover 50 includes five side walls 52 which align with the sides of outer rim 32 when cover 50 is secured to housing 12. An outer wall 54 extends inwardly from sides 52 to form the face of the cover and includes a rotatable central section 56. As shown in FIGS. 5 and 6, a plurality of apertures 58 are formed through at least one side 52 of air inlet cover 50. A generally circular rim 59, of approximately the same diameter as air inlet 26, which is formed as part of a removable insert 72, extends perpendicularly inwardly from an inner surface 61 of outer wall 54. Insert 72 is attached to the inside of air inlet cover 50 by a plurality of screws 74. A plurality of L-shaped locking tabs 60 extend radially outward from rim 59. Each locking tab 60 has a locking flange 62 which is spaced from and extends generally in the direction of surface 61 and a wall 65 generally perpendicular to flange 62. In addition, a pair of detents 64 are formed in the inner surface of rim 59.

Latching tabs 32 cooperate with locking tabs 60 and latching projections 42 cooperate with detents 64 to removably secure air inlet cover 50 to housing 12. Air inlet cover 50 is first placed over air inlet 26 so that locking flanges 62 are slightly out of rotative alignment with latching tabs 36. Air inlet cover 50 is thereafter rotated so that locking flanges 62 enter the open end of latching tabs 36 and interlock between latching flanges 40 and latching surface 34. Further rotation of air inlet cover 50 beyond this point is prevented by flanges 40, 62 abutting walls 65, 38. Rotation in the opposite direction is hindered by latching projections 42 being received within detents 64. The holding force of projections 42 within detents 64 must be overcome to rotate air inlet cover 50 in the opposite direction for its removal.

Figure 8:
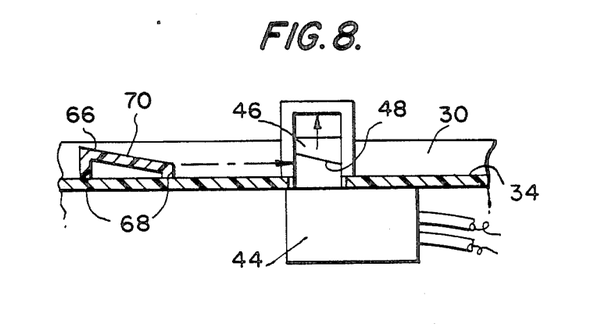
FIG. 8 is a view taken generally along line 8—8 of FIG. 6 with the actuator tab added to the Figure.

A switch actuator tab 66 extends outward from rim 59 and includes a lower surface 68 adapted for sliding contact with latching surface 34 and a ramp surface 70 which has an incline generally matching the incline of surface 48 of switch tab 46. During the rotary motion of air inlet cover 50 to secure cover 50 to housing 12, ramp surface 70 contacts inclined surface 48 and pushes switch tab 46 upwardly as shown in FIG. 8. With switch 44 on, power can be supplied to motor 18 through an on-off, speed control switch 85, as shown in FIG. 18.

Figures 9, 10, 11, 12:
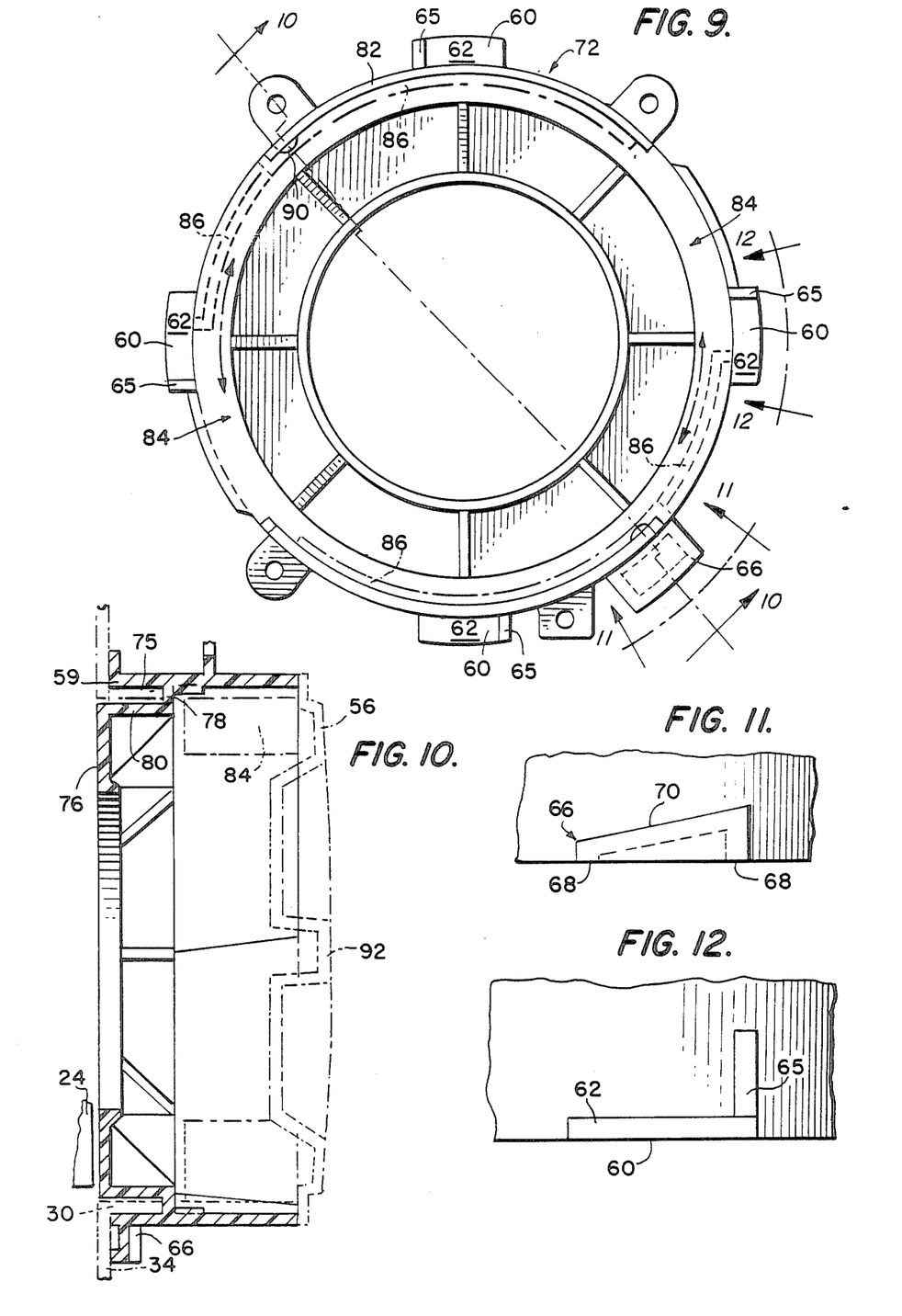
FIG. 9 is a plan view of an insert having locking tabs and an actuator tab, removed from the interior of the air inlet cover.
FIG. 10 is a cross-sectional view taken generally along lines 10—10 of FIG. 9.
FIG. 11 is a view taken generally along curved line 11—11 of FIG. 9.
FIG. 12 is a view taken generally along curved line 12—12 of FIG. 9.

Referring now to FIGS. 4 and 10, insert 72 also includes a ring 76 spaced radially inward from rim 59, and connected thereto by a radial extension 78 and an axial extension 80. A gap 75 is formed between rim 59 and extensions 78 and 80, and has sufficient depth so that rim 30, which extends from latching surface 34, fits completely within gap 75 when the lower surfaces of tabs 66 and 60 contact latching surface 34, as shown in FIG. 10. As seen therein ring 76 is thus disposed very close to the surface of impeller blades 24. In this manner, ring 76 prevents air from spilling between the high pressure side and the low pressure side of impeller blades 24 when impeller 22 is rotated. This in turn increases the pressure developed by the apparatus 10 during operation as a blower.

Insert 72 also includes a pair of perimeter wall sections 82, which are formed as extensions from rim 59 and extend to contact with the inner surface of wall 54 on cover 50. Referring to FIG. 9, gaps 84 are formed between wall sections 82 to admit air into the interior of ring 76 and hence to impeller 22. The size of gaps 84 is easily adjustable by rotating central section 56 of cover 50. Central section 56 includes a pair of downwardly depending perimeter wall sections 86 which fit within and slide against perimeter wall sections 82 of insert 72. See FIG. 9. The rotation of central section 56 moves perimeter wall sections 86 into gaps 84 to vary their size. Wall sections 86 are shown in full line in FIG. 9 wherein gaps 84 are at their maximum width and in dashed line wherein the gaps 84 are narrowed. Perimeter wall sections 86 also include a ratchet section 88 along their respective lower edges. Ratchet sections 88 cooperate with curved projections 90 extending from the interior of perimeter wall sections 82 to thereby releasably hold or latch central section 56 at a desired rotative position. Central section 56 includes a centrally disposed handle 92 to assist in the rotary motion. Thus, by rotating central section 56, the size of gaps 84 is adjusted and the amount of air flow during the blower mode of operation is adjustable.

FIG. 9 illustrates apparatus 10 in its blower mode of operation. As shown therein, an operator holds apparatus 10 by a handle portion 94 of housing 12 and directs an air flow from air outlet 28 through one or more tubes 96 removably secured to air outlet 28.

Figure 17:
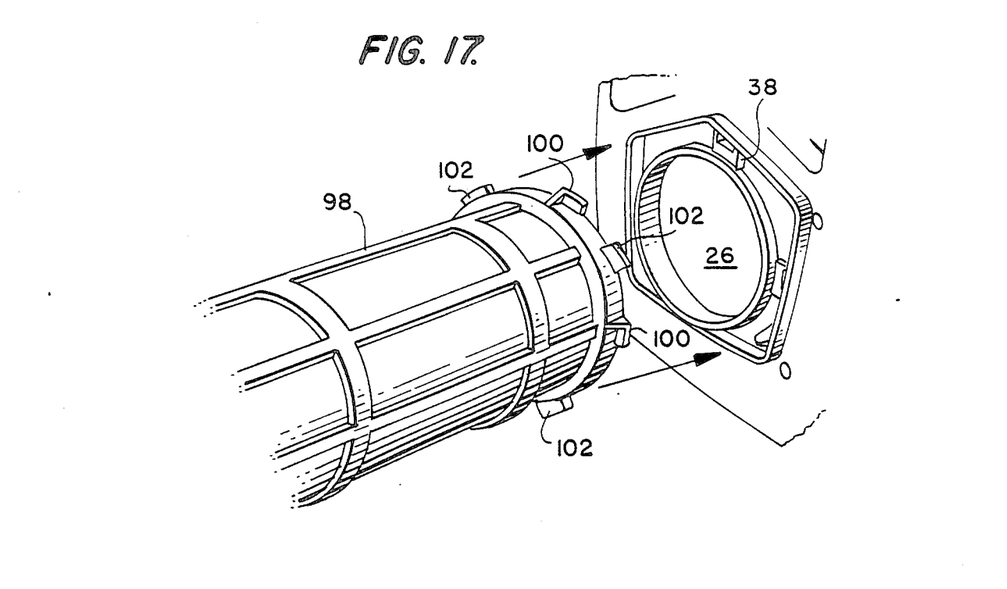
FIG. 17 is an exploded and simplified perspective view illustrating the vacuum nozzle adjacent the air inlet of the housing.

To convert apparatus 10 from its blower mode of operation to its vacuum mode of operation, air inlet cover 50 is rotated to remove locking tabs 60 from their engagement to latching tabs 36. During this motion, switch actuator 66 disengages from switch tab 46, which returns to its down inward biased off position, thereby disabling motor 18. See FIG. 16. As shown in FIG. 17, a vacuum nozzle 98 having locking tabs 100, similar in construction to locking tabs 60, and four switch actuator tabs 102 (three of which are shown), similar to switch actuator tab 66, is inserted over inlet 26 and rotated. Nozzle 98 is thus secured to housing 12 and switch tab 46 is moved to its on position by one of the switch actuator tabs 102. The remaining actuator tabs 102 are received under cover tabs 107 which extend from latching surface 34 of housing 12.

Figure 13:
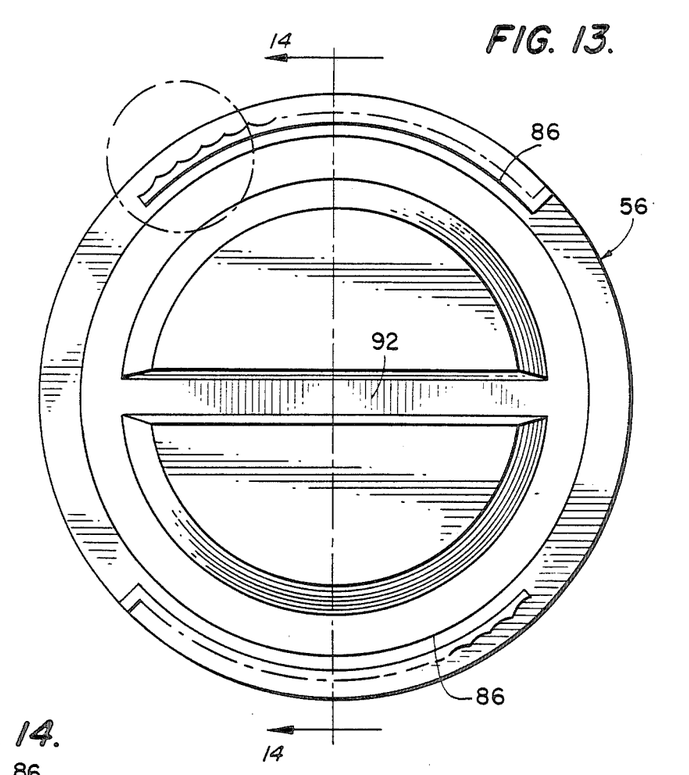
FIG. 13 is a plan view of a rotatable center section of the air inlet cover.
Figure 14:
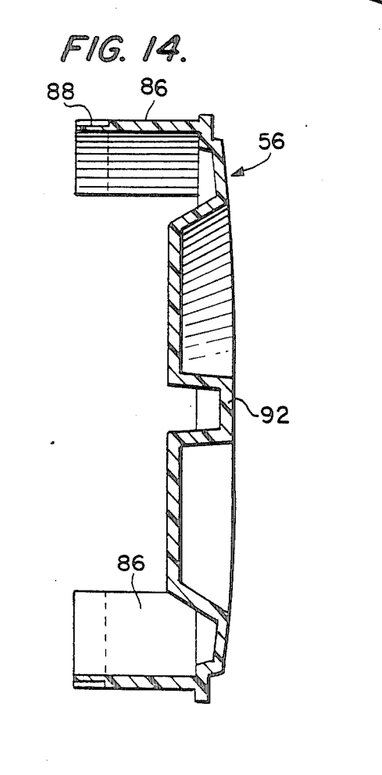
FIG. 14 is a cross-sectional view taken generally along line 14—14 of FIG. 14.
Figure 15:
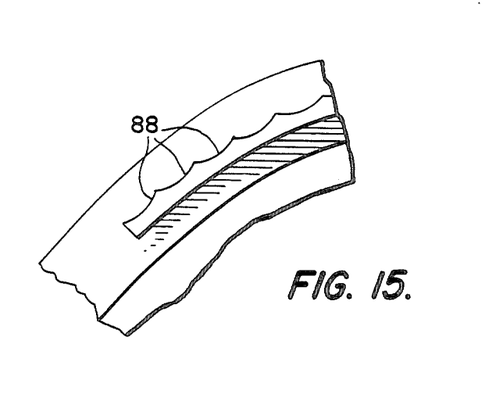
FIG. 15 is an enlarged view of the area circled in FIG. 13.

FIGS. 13 and 14 illustrate the operation of apparatus 10 in its vacuum mode. As seen therein, a debris bag 104 is secured over air outlet 28 in place of the blower nozzles 96. Apparatus 10 is held in one hand by handle 94 and in the other hand by a reduced thickness area 106. Reduced thickness area 106 is of a thickness which is easily graspable by a hand and is located generally in the same plane as handle 94, but on an opposite side of housing 12 from handle 94. The location and size of handle 94 and reduced thickness area 106 facilitates the two handed operation of the apparatus during operation as a vacuum, without the requirement of a second handle. As seen in FIG. 3, reduced thickness area 106 has approximately the same thickness as handle 94.

The combined vacuum-blower according to the present invention has numerous advantages. For example, when air inlet cover 50 is secured to housing 12 and the blower tubes 96 are coupled to air outlet 28 through any suitable means, such as a press fit connection the apparatus is configured for use as a blower. Because switch tab 46 on the activator switch 44 has been pulled upwardly by cover 50, the manual activation of the on-off speed control switch 85 by the operator will turn on the motor and select different speeds, as shown in the circuit diagram of FIG. 18. Impeller 22 will then rotate drawing air into the blower through the air inlet cover 50. The air flows through the apertures 58 in cover 50 and also beneath the lower edge of the rim 52 as this rim is spaced away from the side of housing 12 (see FIG. 2), then through the adjustably sized gaps 84 located in the insert 72 and finally downwardly through the flow restriction ring 76 into air inlet 26. The air will then be expelled in a forceful manner through air outlet 28 and tubes 96. The use of the flow restricting ring 76 is particularly advantageous since it decreases the effective size of air inlet 26 and thereby increases the jet velocity of the expelled air stream without increasing the size of the motor 18. In addition, placing ring 76 closely adjacent to the plane of impeller blades 24 further controls the air flow and prevents spillage of air from the high to low pressure sides.

Figure 20:
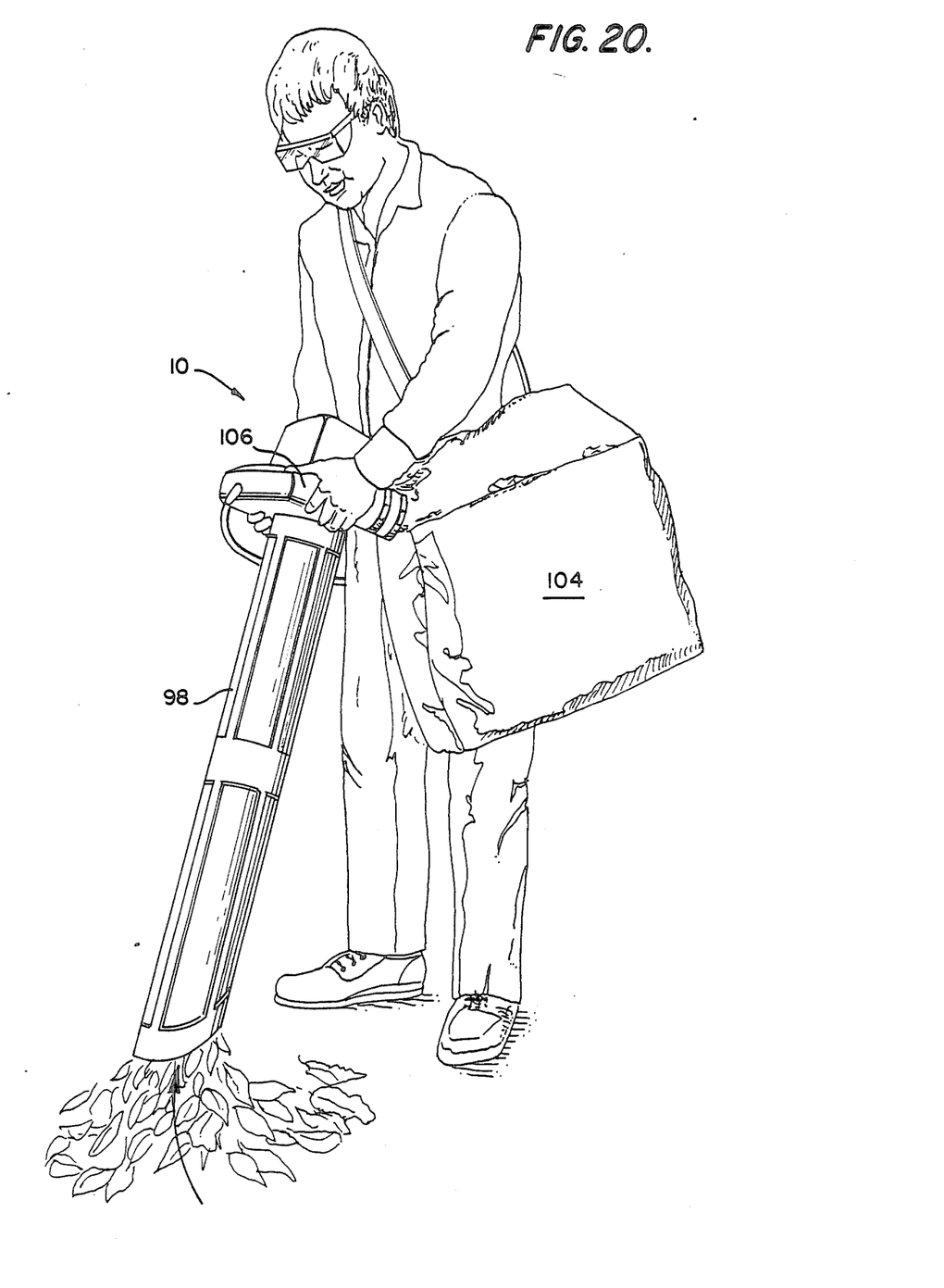
FIG. 20 is a perspective view illustrating the vacuum-blower in its vacuum mode of operation.
Figure 21:
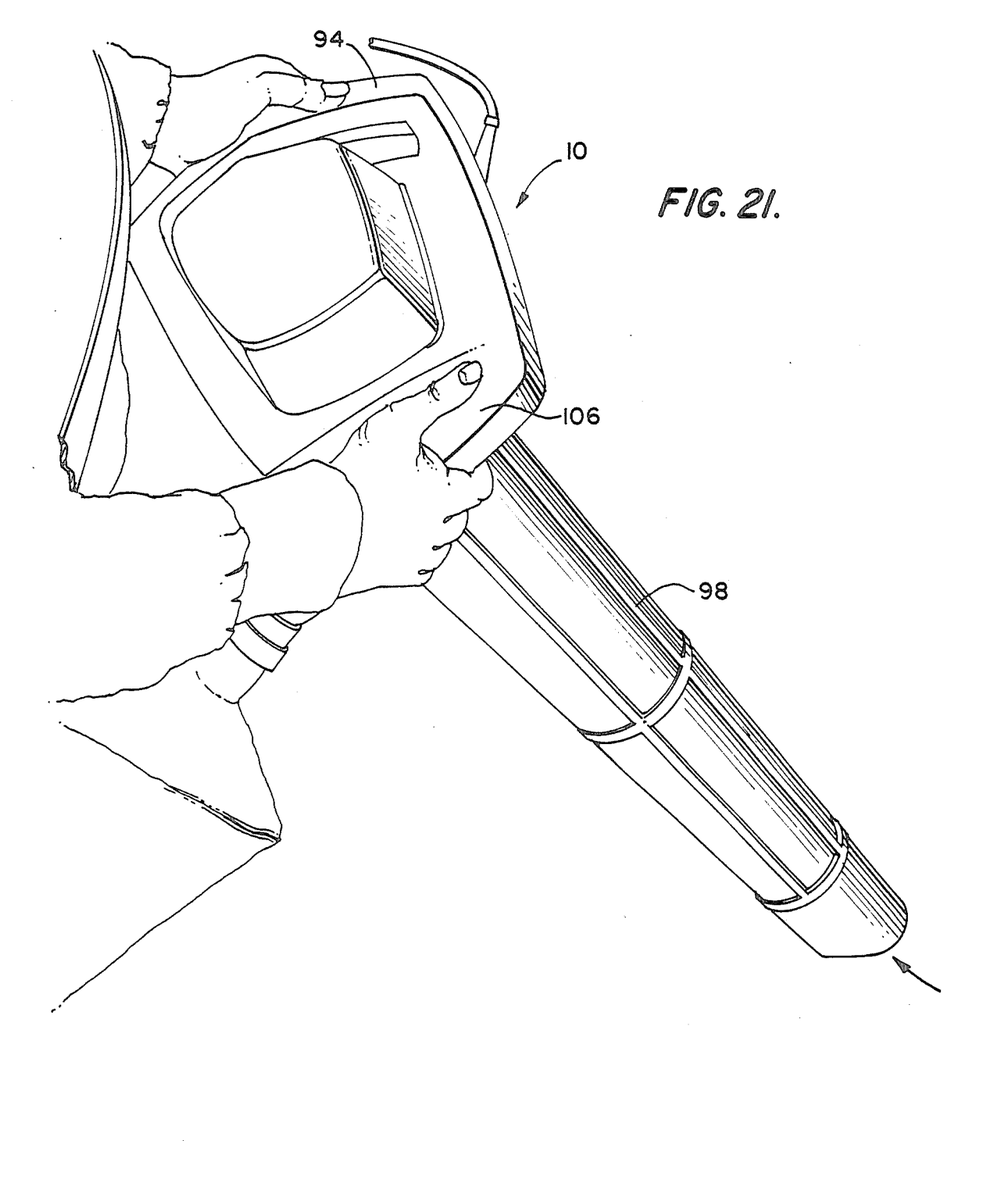
FIG. 21 is a close up perspective view of the vacuum-blower in its vacuum mode of operation.

When it is desired to convert the apparatus for use as a vacuum, nozzle tubes 96 are removed from the air outlet 28 and replaced with the debris bag 104. In addition, air inlet cover 50 is removed from housing 12 and the vacuum nozzle 98, having locking tabs 100 similar to those on cover 50, is locked into place on housing 12 in the same manner as cover 50, e.g. by placing locking tabs 100 adjacent to but offset from latching tabs 36 and then rotating nozzle 98. Vacuum nozzle 98 may be a single piece or formed from a base nozzle assembly with one or more extension tubes releasably coupled together. In any event, after the vacuum nozzle 98 is in place, the apparatus may be used as a vacuum as shown in FIG. 20. The vacuum at the air inlet side is used to suck up debris materials which are then conducted through the housing 12 into the debris bag 104.

The vacuum nozzle 98 does not contain a flow constriction ring similar to the ring 76. When the apparatus is used as a vacuum, it is desirable not to restrict the size of air inlet 26 in any fashion so as to minimize the chances of leaves or twigs clogging impeller blades 24. Accordingly, building the flow restriction ring 76 as part of the air inlet cover 50, on which it is needed, but leaving a similarly shaped ring off of the vacuum nozzle 98 is also advantageous in that it automatically restricts the size of air inlet 26 depending upon which operation is being conducted without having the operator manually insert or remove a replaceable ring. Moreover, the vacuum-blower apparatus of this invention is advantageous in using the interlock safety or activator switch 44. Such a switch is hard to defeat and insures that the impeller cannot be activated unless either the vacuum nozzle 98 or air inlet cover 50 is in place. Accidental injuries will be thereby better avoided.

Numerous characteristics and advantages of the invention have been set forth in the foregoing description, together with details of the structure and function of the invention, and the novel features thereof are pointed out in appended claims. The disclosure, however, is illustrative only, and changes may be made in detail, especially in matters of shape, size and arrangement of parts, within the principle of the invention, to the full extent indicated by the broad general meaning of the terms in which the appended claims are expressed.

We claim:

1. A convertible vacuum-blower comprising:
   a housing having an air inlet and an air outlet;
   a motor supported in said housing;
   an impeller supported for rotary motion in said housing, in fluid communication with said air inlet and said air outlet, and rotatably driven by said motor;
   a removable air inlet cover for covering said air inlet, said air inlet cover having apertures for passage of air through the cover;
   attachment means for removably securing said air inlet cover to said housing;
   switch means carried by said housing for allowing said motor to operate when said air inlet is covered but not when said air inlet is uncovered; and
   first switch actuator means carried by said air inlet cover for actuating said switch means when said cover is secured to said housing covering said air inlet.

2. A convertible vacuum-blower in accordance with claim 1 further comprising a removable vacuum nozzle for attachment to said housing over said air inlet, said vacuum nozzle including second switch actuator means for actuating said switch means when said vacuum nozzle is secured to said housing covering said air inlet.

3. A convertible vacuum-blower in accordance with claim 2 including a debris bag for removable attachment to said air outlet during operation of said vacuum-blower as a vacuum.

4. A convertible vacuum-blower in accordance with claim 2 wherein said switch means includes a switch tab biased toward said housing, and said second switch actuator means includes an actuator tab carried by said vacuum nozzle for contacting and pulling said switch tab away from said housing.

5. A convertible vacuum-blower in accordance with claim 4 wherein the area of said housing surrounding said air inlet includes a latching surface, said switch tab extends above said latching surface and includes an inclined surface spaced from and facing said latching surface, said actuator tab of said second switch actuator means having a ramp surface with an incline generally matching the inclined of said switch tab, said ramp surface facing said inclined surface whereby motion of said ramp surface along said inclined surface during attachment of said cover to said housing pulls said switch tab outward of said latching surface and housing.

6. A convertible vacuum-blower in accordance with claim 4 wherein said attachment means includes a plurality of latching tabs extending from said latching surface and having latching flanges spaced from and extending along said latching surface, and said vacuum nozzle including a plurality of locking tabs with locking flanges, said locking flanges interlocking between said latching flanges and said latching surface by rotary motion of said vacuum nozzle with respect to said housing.

7. A convertible vacuum-blower in accordance with claim 1 including a blower nozzle for removable attachment to said air outlet during operation of said vacuum-blower as a blower.

8. A convertible vacuum-blower in accordance with claim 1 wherein said switch means includes a switch tab biased toward said housing, and said first switch actuator means includes an actuator tab carried by said cover for contacting and pulling said switch tab away from said housing.

9. A convertible vacuum-blower in accordance with claim 8 wherein the area of said housing surrounding said air inlet includes a latching surface, said switch tab extends above said latching surface and includes an inclined surface spaced from and facing said latching surface, said actuator tab of said first switch actuator means having a ramp surface with an incline generally matching the incline of said switch tab, said ramp surface facing said inclined surface whereby motion of said ramp surface along said inclined surface during attachment of said cover to said housing pulls said switch tab outward of said latching surface and housing.

10. A convertible vacuum-blower in accordance with claim 8 wherein said attachment means includes a plurality of latching tabs extending from said latching surface and having latching flanges spaced from and extending along said latching surface, and said cover including a plurality of locking tabs with locking flanges, said locking flanges interlocking between said latching flanges and said latching surface by rotary motion of said cover with respect to said housing.

11. A convertible vacuum-blower in accordance with claim 1 wherein said cover includes means for increasing the pressure developed by said vacuum-blower during operation as a blower when air is being supplied to said impeller through said apertured cover.

12. A convertible vacuum-blower in accordance with claim 11 wherein said pressure differential increasing means includes a ring carried by said cover and disposed sufficiently close to said impeller to prevent air spill between the high pressure side and low pressure side of impeller blades of said impeller.

13. A convertible vacuum-blower in accordance with claim 1 wherein said housing includes a handle located in a plane transverse to the axis of rotation of said impeller, said housing further including a grasping area having a reduced thickness easily graspable by a hand, said grasping area being located generally in the same plane as said handle and on an opposite side of said housing from said handle to facilitate two handed operation of said vacuum-blower during operation as a vacuum.

14. A convertible vacuum-blower in accordance with claim 1 wherein said cover includes means for adjusting the size of the air inlet aperture through said cover.

15. A convertible vacuum-blower in accordance with claim 14 wherein a rim projects inwardly between said housing and an interior surface of said air inlet cover, at least one gap being formed through said rim, and said size adjusting means includes a second rotatable rim projecting inwardly toward said housing and overlapping with said first rim, the rotational position of said second rim with respect to said first rim determining the size of said gap.

16. A convertible vacuum-blower comprising:
a housing having an air inlet and an air outlet;
a motor supported in said housing;
an impeller having a plurality of impeller blades supported for rotary motion in said housing, in fluid communication with said air inlet and said air outlet, and rotatably driven by said motor;
a removable air inlet cover for covering said air inlet, said air inlet cover having apertures for passage of air through the cover;
attachment means for removably securing said air inlet cover to said housing; and
said cover including means for increasing the pressure developed by said vacuum-blower during operation as a blower when air is being supplied to said impeller through said apertured cover.

17. A convertible vacuum-blower in accordance with claim 16 wherein said pressure differential increasing means includes a ring carried by said cover and disposed sufficiently close to said impeller to prevent air spill over between the high pressure side and low pressure side of said impeller blades during rotation of said impeller.

* * * * *